United States Patent [19]

Hara et al.

[11] 3,911,146

[45] Oct. 7, 1975

[54] METHOD OF PRESERVING THE COLOR OF ANIMAL TISSUE

[75] Inventors: Hiramasa Hara; Muneharu Nakano; Saburo Kamiura, all of Ehime, Japan

[73] Assignee: Seinankaihatu Co. Ltd., Japan

[22] Filed: Mar. 13, 1974

[21] Appl. No.: 450,567

Related U.S. Application Data

[63] Continuation of Ser. No. 230,940, March 1, 1972, abandoned.

[30] Foreign Application Priority Data

Mar. 7, 1971 Japan............................ 46-13323
Nov. 16, 1971 Japan........................... 46-91064

[52] U.S. Cl................. 426/265; 426/332; 426/657
[51] Int. Cl.[2]........................................... A23L 1/27
[58] Field of Search...................... 426/264–266, 426/262, 302, 310, 332

[56] References Cited
UNITED STATES PATENTS

| | | | |
|---|---|---|---|
| 1,289,850 | 12/1918 | Manvel............................ | 99/157 |
| 2,541,572 | 2/1951 | Coleman........................... | 99/157 |
| 2,681,095 | 8/1972 | Inklaar............................. | 99/208 |
| 2,937,948 | 5/1960 | Luce................................ | 99/150 |
| 3,266,909 | 8/1966 | Ellis................................. | 99/157 |
| 3,666,488 | 5/1972 | Nakao.............................. | 99/107 |
| 3,821,437 | 6/1974 | Heller.............................. | 426/265 |

*Primary Examiner*—Norman Yudkoff
*Assistant Examiner*—Hiram H. Bernstein
*Attorney, Agent, or Firm*—Hans Berman

[57] ABSTRACT

The color of meat and other animal tissue due to hemoglobin or myoglobin as coloring agents can be preserved by contacting the animal tissue with the water-soluble ingredients of edible vegetal matter in the form of an aqueous solution obtained from the vegetal matter by pressure or liquid extraction or in the form of solids produced by evaporation of the aqueous solution. The color preserving effects equal those of sodium nitrite or potassium nitrate and may be further enhanced by mixing the vegetal ingredients with ascorbic or erythorbic acid or their non-toxic, water-soluble salts, nicotinaminde, pentoses, or amino acids, the adjuvants being most effective as mixtures.

7 Claims, No Drawings

METHOD OF PRESERVING THE COLOR OF ANIMAL TISSUE

This application is a continuation of the application Ser. No. 230,940, filed on Mar. 1, 1972, and now abandoned.

This invention relates to improvement and preservation of the color of animal tissue such as meat and internal organs of animals in which hemoglobin or myoglobin are contained as coloring agents.

The attractive flesh color of meat and other animal tissue colored by hemoglobin or myoglobin turns brownish during storage because of chemical changes in the coloring material. It has been common practice to apply nitrates and/or nitrites to animal tissue to preserve the color, but the nitrates are effective mainly by their conversion to nitrite in the meat, and the nitrites have been found to be toxic in amounts not much greater than those employed.

It has now been found that the water-soluble ingredients of edible vegetal matter, when contacted with animal tissue colored by hemoglobin or myoglobin, preserve the color of the tissue in a subsequent heat treatment, such as cooking, and that the effect achieved can be as good as that of nitrite. Being derived from edible vegetal matter, the color-preserving agents of the invention are non-toxic in the necessary amounts. Their exact chemical nature has not yet been ascertained, but they are common to all edible vegetal matter that we have been able to test.

Suitable water-soluble ingredients may be found in roots, stems, leaves, and fruits of plants, and may be recovered by comminuting the plant material and separating a liquid phase from the solids, by extracting the plant material with water, or by pressing a juice from the plant material. The active, water-soluble vegetal ingredients appear to be relatively simple organic compounds which are not affected by heat treatment up to the boiling point of water, by deep-freezing, by removal of the water from their aqueous solutions, and by combinations of such treatments.

They may be contacted with the animal tissue in any desired manner, as by immersing the tissue in aqueous solutions of the plant ingredients, by spraying the tissue with aqueous solutions of the plant ingredients, by sprinkling the surface of the tissue with the dry ingredients, by injecting the tissue with solutions of the plant ingredients, by mixing the comminuted animal tissue with the vegetal material in the form of its aqueous solutions or in solid form, and in any other way conventional in the curing of meat.

When the water-soluble plant ingredients are applied to the surface of a piece of animal tissue, it is convenient, though not necessary, simultaneously to apply sodium chloride (table salt), and thereby to produce a liquid film of high osmotic pressure on the tissue surface which hastens penetration of the animal tissue by the vegetal agents of the invention.

Unless the water-soluble plant ingredients are to be used immediately after their preparation, it is preferred to sterilize the material to prevent its decomposition by enzymes present or formed during storage. Exposure to a temperature of about 90°C for 10 minutes, and preferably for about 30 minutes, is effective. The water-soluble plant ingredients required for preserving the color of animal tissue are not affected by the heat treatment, but other ingredients, initially soluble, may become insoluble and may be removed. The sterile condition of the color preserving agents may be maintained after heat treatment by storage in a tight container, drying by heat or freeze-drying and similar procedures, conventional in themselves.

Chopped, shredded, or otherwise comminuted plant material, which releases its water-soluble ingredients, may be contacted directly with animal tissue. It is normally more convenient to remove the water-insoluble ingredients from the agents of the invention prior to contacting the latter with the animal tissue.

The amount of water-soluble ingredients that is to be employed varies according to the plant employed, the specific plant part used, the method of application to the animal tissue, and other process variables. Some testing is unavoidable for any specific set of conditions, and such testing may be guided by the observation that approximately 15 to 100 ml of the natural plant juice separated from the plant solids or an amount of aqueous extract obtained from plant material which would yield 15 to 100 ml juice under pressure when comminuted, is required for preserving the color of 1 kilogram of meat or other animal tissue. In most instances, 30 to 60 ml juice or the corresponding amount of extract is effective. If the water-soluble ingredients are recovered as a solid material free from insoluble ingredients, the application rate is approximately 1 to 10 g per kg of animal tissue, and 1.5 to 6 g are usually effective.

The action of the vegetal ingredients of the invention on the color of stored animal tissue can be enhanced by certain adjuvants which may not have any color preserving effect of their own. They include vitamins, such as L-ascorbic acid, its non-toxic salts, and nicotinaminde, but also erythorbic acid and its non-toxic salts, particularly the sodium salt. Amino acids generally enhance the effects produced by the vegetal ingredients, and aspartic acid, glutamic acid, alanine, valine, leucine, proline, γ-aminobutyric acid are merely examples of the amino acids found useful in this invention. Pentoses such as d-xylose, l-arabinose, and d-ribose have been used successfully in combination with the vegetal ingredients of the invention.

The amounts of the adjuvants needed to enhance the color preserving effect of the water-soluble plant ingredients varies. Approximately 0.1 to 0.5% by weight based on the plant juice or its equivalent is preferably used of ascorbic acid, erythorbic acid, their salts or nicotinamide. The amino acids and pentoses are used to best advantage in a ratio of 0.5 to 1.0% of the dissolved solids in the plant juice or its equivalent. Little, if anything, is achieved with smaller amounts of the adjuvants, but they may be used in larger amounts than indicated without harmful effect. However, no further improvement is achieved by exceeding the upper limits indicated above.

Amino acids and pentoses are best used in combinations in which the amino acids amount to 0.5 to 2.0 parts, and the pentoses to 1.5 to 6 parts, a weight ratio of 1:3 being preferably maintained between the amino acids and the pentoses.

The adjuvants are mixed with the plant ingredients at any suitable stage prior to contacting with the animal tissue, but may be mixed with the plant ingredients even after initial contact has been established.

The following Examples are further illustrative of this invention, and it will be understood that the invention is not limited thereto.

EXAMPLE 1

Fresh samples of spinach (leaves and roots), Chinese cabbage, lettuce, onions, potatoes, oranges (peel), turnips (leaves and roots), carrots, cabbage, and other edible vegetables and fruits were comminuted in a mechanical mixer having rapidly rotating, sharp blades (Waring Blendor). Each comminuted sample of the vegetables and fruits specifically mentioned above was divided into two portions. One portion was subjected directly to centrifuging at high speed to separate a juice practically free from solids from a residue which was discarded. The second portion of each sample was heated in a container on a steam bath at about 100°C for 30 minutes, and solids were removed thereafter by centrifuging. The samples were of sufficient amounts to yield at least 9 ml juice from each portion.

300 g Specimens of fresh pork were sprayed with 9 ml of respective juices and further sprinkled with 6 g table salt. Each meat specimen was thereafter stored in a refrigerator at about 5°C for 4 or 8 days, and then soaked in water at 70°C for approximately 30 minutes to develop and fix the color of the cured, cooked meat.

The color difference between the original meat and the cured and cooked specimens was then assigned a value by an experienced meat inspector on an arbitrary, but readily reproducible scale on which (−) indicates deterioration characteristic of a control which was merely treated with salt, (+) indicates slight improvement, (++) good color retention, and (+++) a superior result.

The results obtained from juices of raw and heated vegetables or fruits were closely similar for the same species, and did not differ by more than a fraction of one step on the chosen scale. Only one value is indicated, therefore, for each type of vegetal matter in Table 1 hereinbelow. Vegetables and fruits other than those specifically named above were treated without heating, and the juices obtained were applied to pork in the manner described above. Where only the name of the plant appears in the Table, it will be understood that the normally eaten part was the source of the juice. Burdock root and the leaves of shepherd's purse are eaten as vegetables in Japan and are included for this reason among the tested species of edible vegetal matter.

Each meat specimen was tested for initial nitrate and nitrite content immediately after being treated with juice and salt and prior to cold storage. The testing method employed was that standardized for animal feed by the Association of Official Agricultural Chemists. The effect of each juice was tested after 4 days and after 8 days of cold storage, and the nitrates and nitrites present after 4 and 8 days were determined. The nitrate and nitrite values listed in the Table are calculated as p.p.m. potassium nitrate and sodium nitrite respectively. Trace amounts are indicated by $x$, and $o$ indicates that none was found. For comparison purposes, two sets of meat specimens were also treated with potassium nitrate and sodium nitrite in a conventional manner (Table 2).

TABLE 1

| Vegetal Matter | Initial, PPM | | After 4 Days | | | After 8 Days | | |
|---|---|---|---|---|---|---|---|---|
| | $KNO_3$ | $NaNO_2$ | Color | $KNO_3$ | $NaNO_2$ | Color | $KNO_3$ | $NaNO_2$ |
| Spinach (root) | 38 | 2.0 | +++ | 15 | 3.2 | +++ | 5 | 1.2 |
| " (leaves) | 33 | 2.0 | ++ | 20 | 2.0 | +++ | 5 | 1.5 |
| Chinese cabbage | 17 | x | ++ | 5 | x | +++ | o | x |
| Turnip (root) | 25 | 0.8 | +++ | 10 | 0.4 | +++ | 5 | x |
| " (leaves) | 25 | 1.2 | +++ | 10 | 1.2 | +++ | 5 | 1.6 |
| Carrot | 13 | x | ++ | 5 | x | +++ | o | x |
| cabbage | 9 | x | ++ | o | x | +++ | o | x |
| Lettuce | 13 | x | + | 5 | x | +++ | o | x |
| Onion | 6 | x | + | 3 | x | ++ | o | x |
| Potato | 2 | x | + | o | x | +++ | o | x |
| Orange (peel) | 1 | x | + | o | x | + | o | x |
| Radish (root) | 25 | 1.6 | +++ | 15 | 2.0 | +++ | 5 | 1.2 |
| " (leaves) | 21 | 1.6 | +++ | 16 | 2.4 | +++ | 5 | 1.2 |
| Tomato | 8 | x | + | o | x | ++ | o | x |
| Asparagus | 13 | x | + | 5 | x | ++ | o | x |
| Kidney Bean | 13 | x | + | 8 | x | ++ | o | x |
| Cucumber | 8 | x | ++ | o | x | +++ | o | x |
| Burdock | 25 | 2.4 | +++ | 10 | 3.2 | +++ | 5 | 1.6 |
| White muskmelon | 13 | 0.8 | ++ | o | x | +++ | o | x |
| Celery | 50 | 3.2 | ++ | 20 | 6.0 | +++ | 10 | 4.0 |
| Egg-plant | 21 | 1.6 | ++ | 10 | 4.0 | +++ | 5 | 3.2 |
| Stone-Leek | 21 | x | + | 15 | x | + | 10 | x |
| Spanish paprika | 8 | x | + | o | x | ++ | o | x |
| Cauliflower | 21 | x | ++ | 10 | 2.0 | +++ | 10 | 1.6 |
| Broccoli | 21 | x | ++ | 8 | 1.2 | +++ | 5 | 1.2 |
| Apple | 4 | x | + | o | x | + | o | x |
| Perilla (leaves) | 13 | x | + | 5 | x | +++ | o | x |
| Shepherd's purse | 21 | x | ++ | 10 | 1.6 | +++ | 5 | 1.2 |

TABLE 2

| Controls | Initial, PPM | | After 4 Days | | | After 8 Days | | |
|---|---|---|---|---|---|---|---|---|
| | $KNO_3$ | $NaNO_2$ | Color | $KNO_3$ | $NaNO_2$ | Color | $KNO_3$ | $NaNO_2$ |
| $KNO_3$ | 3,000 | 2.5 | + | 2900 | 20 | +++ | 2500 | 40 |
| $NaNO_2$ | o | 100 | +++ | o | 50 | +++ | o | 30 |
| No additive | o | 2.0 | − | o | 2.0 | − | o | 1.6 |

As is evident from Tables 1 and 2, edible vegetal matter provides a juice capable of improving the color of stored meat regardless of the nature of the starting material. Table 1 includes roots, tubers, leaves, fruits including orange peel, which is edible, though rarely eaten. Many of the vegetal juices are fully effective only after 8 days of interaction with the meat at cold storage temperature, but some show excellent effects even after 4 days and are superior to potassium nitrate containing a minor amount of nitrite as an impurity. There is no correlation between the very small nitrite content of meat specimens treated with vegetal juices and the color retention of the specimen in storage.

EXAMPLE 2

Fresh samples of spinach leaves, Chinese cabbage, turnip leaves, cabbage, lettuce, and onions in amounts equal to these used in Example 1 for obtaining 9 ml juice were extracted by boiling in an amount of water approximately equal to 100 to 200% of the weight of the fresh sample. The solids were removed by filtering, and the several extracts were tested in the manner described in Example 1. The results obtained were the same as listed in Table 1 for the same vegetal matter.

EXAMPLE 3

A mixture of approximately equal weights of spinach leaves and Chinese cabbage was extracted as in Example 2, and another extract was prepared from a similar mixture of potatoes, carrots and onions. The two extracts were applied to meat specimens as described in Example 1, and the color retention of the meat was tested as described above. For reasons not understood, the extracts of the mixtures were somewhat more effective than would be expected from the combined effects of the components employed.

EXAMPLE 4

Carrots were thinly sliced, and the slices were dried in a stream of hot air. The dry material was pulverized, and one gram of the carrot powder so obtained was applied to 300 g pork together with 6 g table salt. The meat specimens were stored for 4 and 8 days and tested for color retention as described in Example 1. The results obtained were as good as those obtained with carrot juice and listed in Table 1.

EXAMPLE 5

Cabbage was carefully washed in water until clean of foreign matter, drained, and shredded, and a juice was recovered from the shredded cabbage by applied pressure. The juice was cooked in a jacketed kettle for 30 minutes, and separated from suspended solids in a filter press.

The clear liquid so obtained was used as a base liquor which was applied to 300 g specimens of pork together with 6 g table salt in the manner described in Example 1. The specimens were stored in the refrigerator for 6 days and then checked for color retention after cooking as described above. The results obtained were comparable with those listed in Table 1.

In comparison tests, batches of the base liquor were mixed respectively with L-ascorbic acid, L-sodium ascorbate, erythorbic acid, sodium erythorbate, and nicotinamide in amounts corresponding to 0.3% of the base liquor weight. The solutions were applied to pork, and the stored pork was inspected as described above with reference to the base liquor. The results were uniformly and significantly superior to those seen from the base liquor alone.

Even better results were achieved when mixtures of aspartic acid with d-xylose 1:3, of alanine with valine and d-xylose 1:1:6, of leucine with glutamic acid and l-arabinose 1:1:6, of γ-aminobutyric acid with proline and d-ribose 1:1:6, and aspartic acid with proline and d-xylose 1:1:6 were added to the base liquor in amounts corresponding to 0.8% of the weight of solids content in the liquor.

As a control, a meat specimen was treated with 3 g of a 1:3 mixture of aspartic acid and d-xylose and 6 g salt. The meat color deteriorated as much as with salt alone, showing the lack of color preserving effect of the amino acids and pentoses in the absence of the vegetal matter.

EXAMPLE 6

100 kg Cabbage were washed clean in water, drained, sliced, and extracted by pressure. The extract was boiled in a jacketed kettle for 30 minutes, and suspended solids were removed on a filter press. A clear, light-brown liquid was obtained in an amount of 65 kg. It contained 3% dissolved solids.

This base liquor and its mixtures with minor amounts of the adjuvants described in Example 5, were divided into three portions each. One portion was placed in a polyethylene bag and stored in a refrigerator. A second portion was sealed in a glass bottle and heated until sterile. A third portion was evaporated to dryness by boiling until much of the water present was removed, and by thereafter passing a stream of hot air over the concentrate. The second and third portions were stored at ambient temperature.

The three compositions so obtained from the liquor alone and each of its mixtures were stored for 6 months and thereafter applied to pork as in the preceding Examples. The results obtained were only very slightly inferior to the corresponding results reported above in Example 5. No significant loss in color preserving ability was caused by extended storage under the conditions outlined, nor by conversion to a dry powder.

EXAMPLE 7

65 kg Clear cabbage liquor was prepared as in Example 6. A 30 kg portion was mixed with 1.8 g aspartic acid, 5.4 g d-xylose, and 90 g nicotinamide. The mixture and the remainder of the original liquor were frozen separately at a temperature not higher than −30°C. Samples of each portion were thawed from time to time and tested on pork according to the procedure of Example 5.

Both portions were found effective, the mixture containing adjuvants being consistently better.

EXAMPLE 8

100 kg Radishes with their leaves attached were washed in water until clean, drained, shredded, and extracted under pressure. The extract was boiled in a kettle equipped with a steam jacket for 30 minutes and filtered free of suspended solids. A clear, light-brown liquor containing 4% dissolved solids was obtained in an amount of 75 kg.

The liquor was returned to the kettle and boiled to evaporate water until the solids content was 10%. The concentrate was dried in a double drum dryer at a steam pressure of 4 kg/cm$^2$ to a brown powder containing 5% moisture and weighing 3 kg. To prevent caking of the powder, it was mixed with 7 kg table salt.

The mixture was divided into two 5 kg batches, 1 g aspartic acid, 0.5 g proline, and 5 g d-xylose were intimately mixed with one batch, and the two batches were used for treating pork as described above in Example 5. The results obtained were excellent in both cases so that no further improvement could be observed by the addition of the adjuvants.

While ground pork was chosen in the preceding Examples to permit direct comparison between the results obtained, analogous results were obtained with red meat of other origin, ground or in conventional butcher's cuts. In fish, beef and mutton, the results were the same as in pork, but similar results were also obtained in the meat of chickens and turkeys. Internal organs, such as liver, which owe their reddish color at least in part to the presence of hemoglobin or myoglobin, were similarly affected.

Limited tests indicate that edible vegetal matter not listed in Table 1 yields juices, extracts, and compositions derived from such juices or extracts and containing the water-soluble, solid components which preserve the color of hemoglobin or myoglobin. No instance of edible vegetal matter not having such color-preserving ingredients has been found in wide-ranging spot checks, but variations in the degree of effectiveness were observed within the limits apparent from Table 1.

While the invention has been described with particular reference to specific embodiments, it is to be understood that it is not limited thereto, but is to be construed broadly and restricted solely by the scope of the appended claims.

What is claimed is:

1. A method of preserving the color of animal tissue containing hemoglobin or myoglobin as coloring agent which comprises contacting said tissue with the water-soluble ingredients of vegetal matter until change of color in subsequent heat treatment is reduced, said vegetal matter being an edible part from the group consisting of spinach, turnip, carrot, cabbage, radish, burdock, white muskmelon, celery, egg plant, cauliflower, broccoli, and shepherd's purse, the amount of said water-soluble ingredients contacted with 1 kilogram of said animal tissue being equal to the amount of water-soluble ingredients in 15 to 100 ml of the natural juices separated from the remainder of said vegetal matter by subjecting the comminuted vegetal matter of extracting pressure, and said amount of said water-soluble ingredients being effective for reducing said change in color.

2. A method as set forth in claim 1, wherein said ingredients are separated from the water-insoluble ingredients of said vegetal matter prior to said contacting.

3. A method as set forth in claim 2, wherein said water-soluble ingredients are injected in the form of an aqueous solution into said animal tissue.

4. A method as set forth in claim 2, wherein said water-soluble ingredients are contacted in solid form with said animal tissue.

5. A method as set forth in claim 2, wherein said water-soluble ingredients are mixed prior to said contacting with at least one non-toxic member of the group consisting of ascorbic acid, sodium ascorbate, erythorbic acid, sodium erythorbate, nicotinamide, amino acids, and pentoses, said at least one member being mixed with said water-soluble ingredients in an amount sufficient to enhance the color preserving effect of said water-soluble ingredients.

6. A method as set forth in claim 5, wherein said at least one member is an amino acid which is aspartic acid, glutamic acid, alanine, valine, leucine, proline, or γ-aminobutyric acid.

7. A method as set forth in claim 1, wherein said animal tissue is contacted with sodium chloride while being contacted with said ingredients.

* * * * *

UNITED STATES PATENT AND TRADEMARK OFFICE
CERTIFICATE OF CORRECTION

PATENT NO. : 3,911,146
DATED : October 7, 1975
INVENTOR(S) : HIRAMASA HARA ET AL It is certified that error appears in the above–identified patent and that said Letters Patent are hereby corrected as shown below:

In the heading, line [73], change "Ltd., Japan" to

-- L.T.D., Ehime-ken, Japan --.

In claim 1, line 14 (column 8, line 6), change "of" to

-- to --.

Signed and Sealed this sixth Day of January 1976

[SEAL]

Attest:

RUTH C. MASON
*Attesting Officer*

C. MARSHALL DANN
*Commissioner of Patents and Trademarks*